United States Patent [19]

Wilk

[11] Patent Number: 5,008,527
[45] Date of Patent: Apr. 16, 1991

[54] OPTICAL SYSTEM EMPLOYING A TRANSMITTING SOLID CORNER CUBE

[75] Inventor: Shalom Wilk, Jerusalem, Israel

[73] Assignee: Israel Aircraft Industries Ltd., Ben Gurion International Airport, Israel

[21] Appl. No.: 423,118

[22] Filed: Oct. 19, 1989

[30] Foreign Application Priority Data

Oct. 31, 1988 [IL] Israel .................................. 88243

[51] Int. Cl.[5] .............................................. H01J 3/14
[52] U.S. Cl. ................... 250/216; 250/203.2; 350/102
[58] Field of Search ................ 250/203.1, 203.2, 215, 250/216, 341; 356/152; 244/3.16; 350/286, 287, 102

[56] References Cited

U.S. PATENT DOCUMENTS 3,761,714  9/1973  Fernandez et al. ............. 250/203.2
4,649,274  3/1987  Hartmann ...................... 250/341
4,790,651  12/1988  Brown et al. .................. 250/203.2

FOREIGN PATENT DOCUMENTS 1367531  9/1974  United Kingdom .
1397262  6/1975  United Kingdom .
1407021  9/1975  United Kingdom .
1470756  4/1977  United Kingdom .
1553849  10/1979  United Kingdom .

Primary Examiner—David C. Nelms
Attorney, Agent, or Firm—Darby & Darby

[57] ABSTRACT

Optical apparatus for transferring a portion of radiation emitted from a radiation source having a first line of sight to a radiation sensor having a second line of sight comprising a corner cube having first and second reflective ends arranged to intersect at predetermined orientations with a predetermined one of the first and second lines of sight and each having a predetermined orientation relative thereto; prismatic apparatus mounted onto one or both of the first and second reflective ends so as to define a common interface therewith; and an optical coating provided at the interface defined by the one or both first and second reflective ends and the prismatic apparatus for permitting passage of a first portion of radiation while deflecting a second portion of radiation.

18 Claims, 6 Drawing Sheets

OPTICAL SYSTEM EMPLOYING A TRANSMITTING SOLID CORNER CUBE

FIELD OF THE INVENTION

The present invention relates generally to optical systems and, in particular, to electro-optical reconnaissance and tracking systems.

BACKGROUND OF THE INVENTION

It is well known to use a variety of different electro-optical sensors in advanced electro-optical payloads. Examples of this include the use of a television camera and optical system together with a image intensification or infrared sensor, the use of one of these sensors together with a laser and the combination of these sensor systems and a laser.

In an optical system such as mentioned above, boresighting is necessary to ensure that the laser is aimed at a target intercepting the line of sight of the sensor.

Although boresighting is generally carried out prior to operation of the optical systems, such that the system is not yet engaged in 'viewing' the target, it is also known to carry out boresighting while the system is in use. If the system includes, for example, a tracking system which is operative to lock onto the target, boresighting conventionally interrupts the tracking operation and the target is 'lost'. The total time lost is the time it takes to achieve boresighting plus the time it takes to lock onto the target once again.

Boresighting is conventionally carried out by using an elongated corner-cube assembly in conjunction with a laser and a sensor, both of which form part of a combined system. The corner-cube is mounted for rotation about an axis generally parallel to the lines of sight of the laser and the sensor and comprises a roof mirror at one end and a plane mirror at the other end. In a non-boresighting situation, the corner-cube is oriented such that the lines of sight of the laser and the sensor are unobstructed.

When, however, boresighting is to be performed, the corner-cube is rotated about the axis such that the roof mirror and the plane mirror obstruct the lines of sight of the laser and the sensor so as to interrupt use of the combined system until after boresighting has been completed.

SUMMARY OF THE INVENTION

It an aim of the invention to provide a corner-cube optical assembly facilitating the performing of boresighting operations in a combined optical system, such as a tracking or aiming system including a laser, wherein the corner-cube assembly does not obstruct the lines of sight of the system so as to prevent use thereof while boresighting.

There is provided, therefore, in accordance with an embodiment of the invention, optical apparatus for transferring a portion of radiation emitted from a radiation source having a first line of sight to a radiation sensor having a second line of sight comprising a corner cube having first and second reflective ends arranged to intersect at predetermined orientations with a predetermined one of the first and second lines of sight and each having a predetermined orientation relative thereto; prismatic apparatus mounted onto one or both of the first and second reflective ends so as to define a common interface therewith; and an optical coating provided at the interface defined by the one or both first and second reflective ends and the prismatic apparatus for permitting passage of a first portion of radiation while deflecting a second portion of radiation.

Additionally in accordance with an embodiment of the invention, the first reflective end of the corner cube defines a roof surface and the prismatic apparatus comprises a first end prism mounted onto the roof surface, the at least one optical coating being embedded between the roof surface and the first end prism.

In accordance with an alternative embodiment of the invention, the second reflective end of the corner cube defines a plane surface and the prismatic apparatus comprises a second end prism mounted onto the plane surface, the optical coating being embedded between the plane surface and the second end prism.

In accordance with a further embodiment of the invention, the first reflective end of the corner cube defines a roof surface and the second reflective end of the corner cube defines a plane surface, the prismatic apparatus comprising first and second end prisms respectively mounted onto the roof surface and the plane surface, a first optical coating being embedded between the roof surface and the first end prism and a second optical coating being embedded between the plane surface and the second end prism.

BRIEF DESCRIPTION OF THE DRAWINGS

The present invention will be understood and appreciated more fully from the following detailed description, taken in conjunction with the drawings, in which.

DETAILED DESCRIPTION OF THE INVENTION

Figure 1:
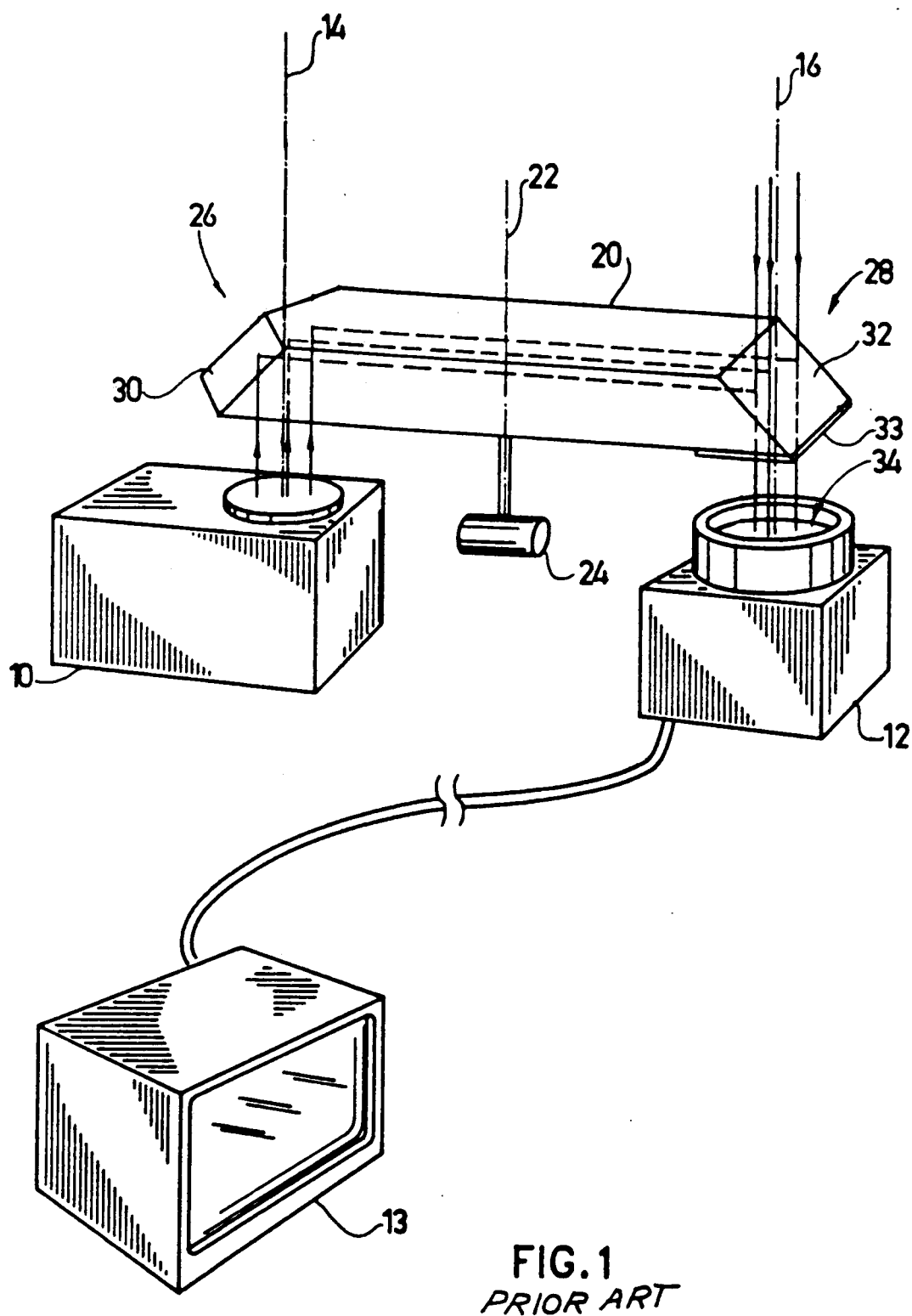
FIG. 1 is a schematic illustration of an electro-optical system employing a prior art corner-cube optical assembly.

Reference is now made to FIG. 1, in which there is shown an electro-optical system in which there is employed a corner-cube assembly constructed in accordance with the prior art.

The electro-optical system which, typically, is associated with a reconnaissance or tracking system, comprises a radiation source 10, such as a 1.06 micron Nd/Yag laser and a sensor 12, such as may be associated with a TV monitor 13. Source 10 and sensor 12 have their respective lines of sight, shown schematically at 14 and 16, almost parallel, so as to intercept a common target (not shown).

A corner-cube, referenced 20, is mounted for rotation about an axis 22 and is selectively rotatable thereabout by means of a motor 24 which is operative to bring first and second ends thereof, respectively referenced 26 and 28, into alignment with respective lines of sight 14 and 16. First end 26 defines a roof mirror 30 and second end 28 defines a plane mirror 32. There is also typically provided an optical filter 33 for reducing laser energy directed towards sensor 12 during boresighting.

During boresighting operations, motor 24 is activated so as to rotate corner-cube 20 from a position transverse to that shown in FIG. 1 to the position shown therein. As is shown in the drawings, roof mirror 26 entirely obstucts line of sight 14 of radiation source 10, while line of sight 16 is partially or completely obstructed, according to the size of the aperture of a lens 34 of sensor 12, by plane mirror 32.

Except in a case where an adjustable density filter is provided in lens 34, the aperture size of the lens depends on the prevailing light conditions, but even when it is larger than plane mirror 32 a very poor quality, faint image is received, so as to make continued viewing of the target during boresighting impossible. In general terms, up to 75 or 80% obstruction of the lens aperture by plane mirror 32 may still permit viewing, but it is preferred that no more than 30% obstruction occur at any time.

Figure 2:
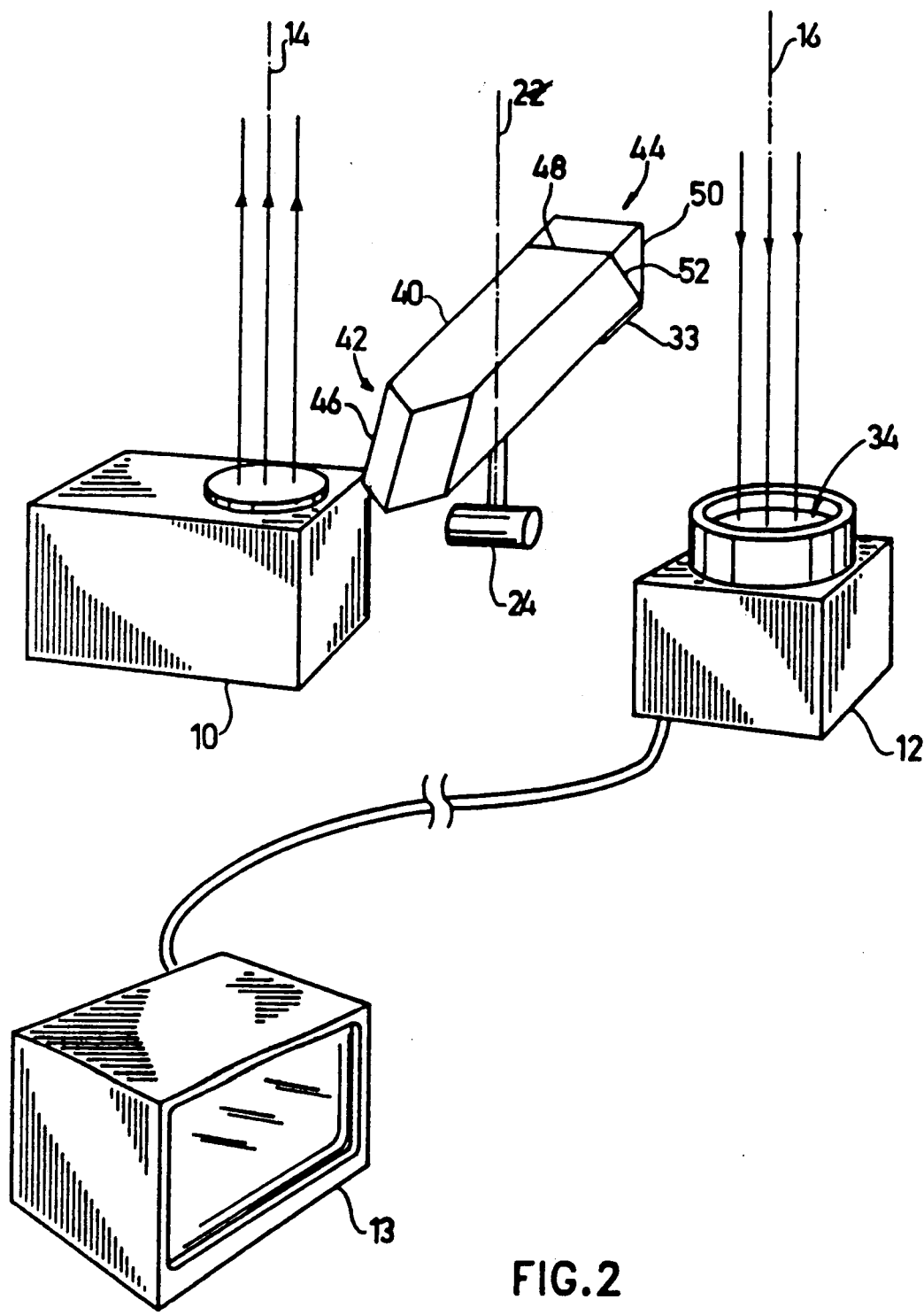
FIG. 2 is a schematic illustration of an electro-optical system employing a corner-cube constructed in accordance with an embodiment of the invention, during a non-boresight mode of operation.
Figure 3:
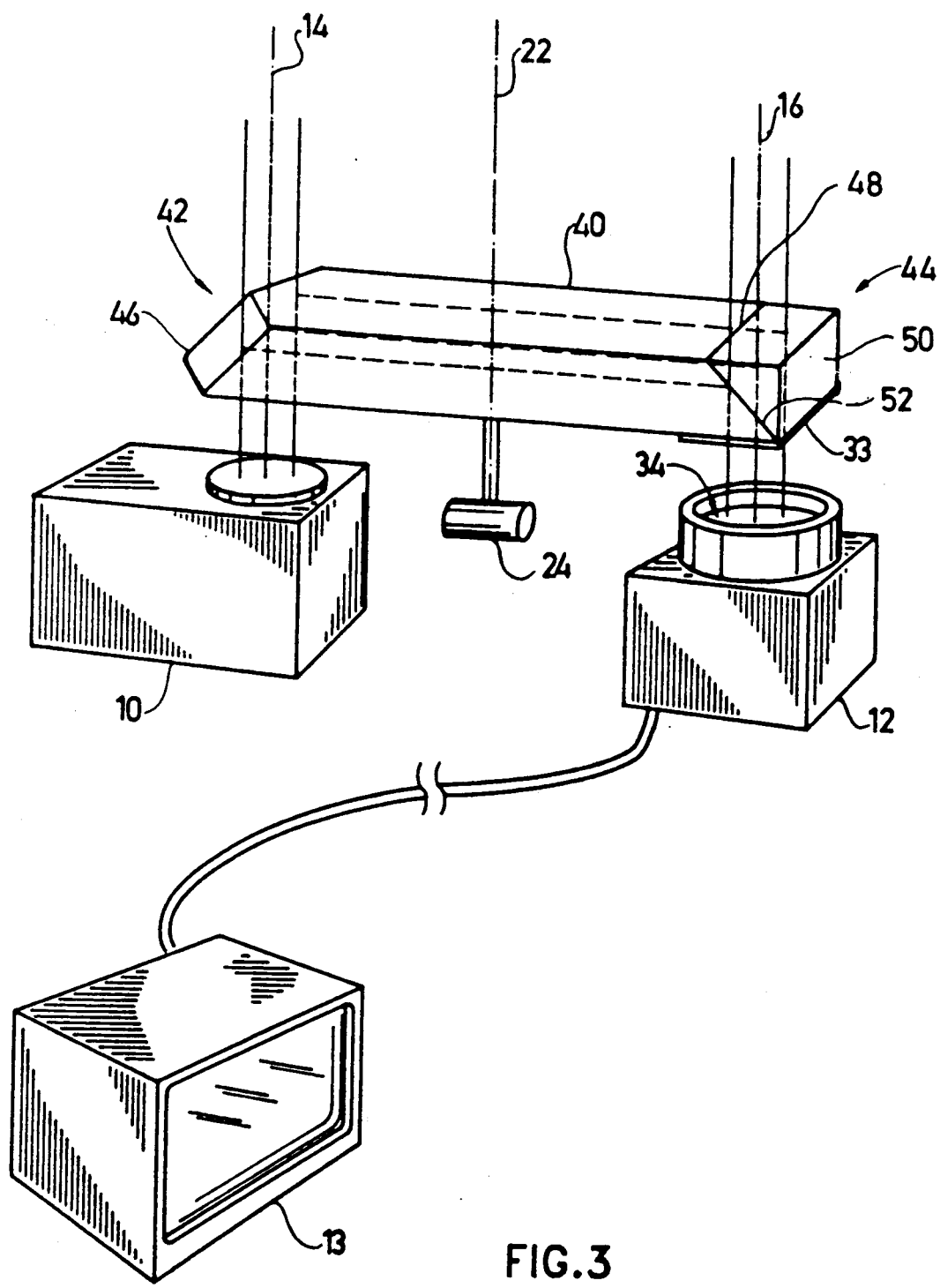
FIG. 3 is a schematic illustration of the electro-optical system shown in FIG. 2, but during a boresight mode of operations.

Referring now to FIGS. 2 and 3, there is shown an electro-optical system, similar to that shown in FIG. 1, but employing a corner-cube assembly constructed and operative in accordance with an embodiment of the invention. The assembly comprises a corner-cube 40 defining a roof mirror 46 at a first end 42 and a plane surface 48 at a second end 44.

According to the shown embodiment, mounted onto surface 48 at second end 44 of corner-cube 40, as by any optical glue as known in the art, is a prism 50, such as a right angle prism, which serves to complete the generally rectangular configuration of the corner-cube assembly. The interface 52, between corner-cube 40 and prism 50 is coated with a dichroic or beamsplitter coating which reflects at least part of the laser radiation while permitting passage of radiation from the target.

With particular reference to FIG. 3, it will be appreciated that when boresighting is performed and corner-cube 40 is rotated so as to intercept the lines of sight of radiation source 10 and sensor 12, although, as in the prior art, line of sight 14 of radiation source 10 is intercepted by the corner-cube, light rays from the target continue to pass, through the coating on interface 52 to sensor 12, thereby permitting continued viewing of the target.

Figure 4:
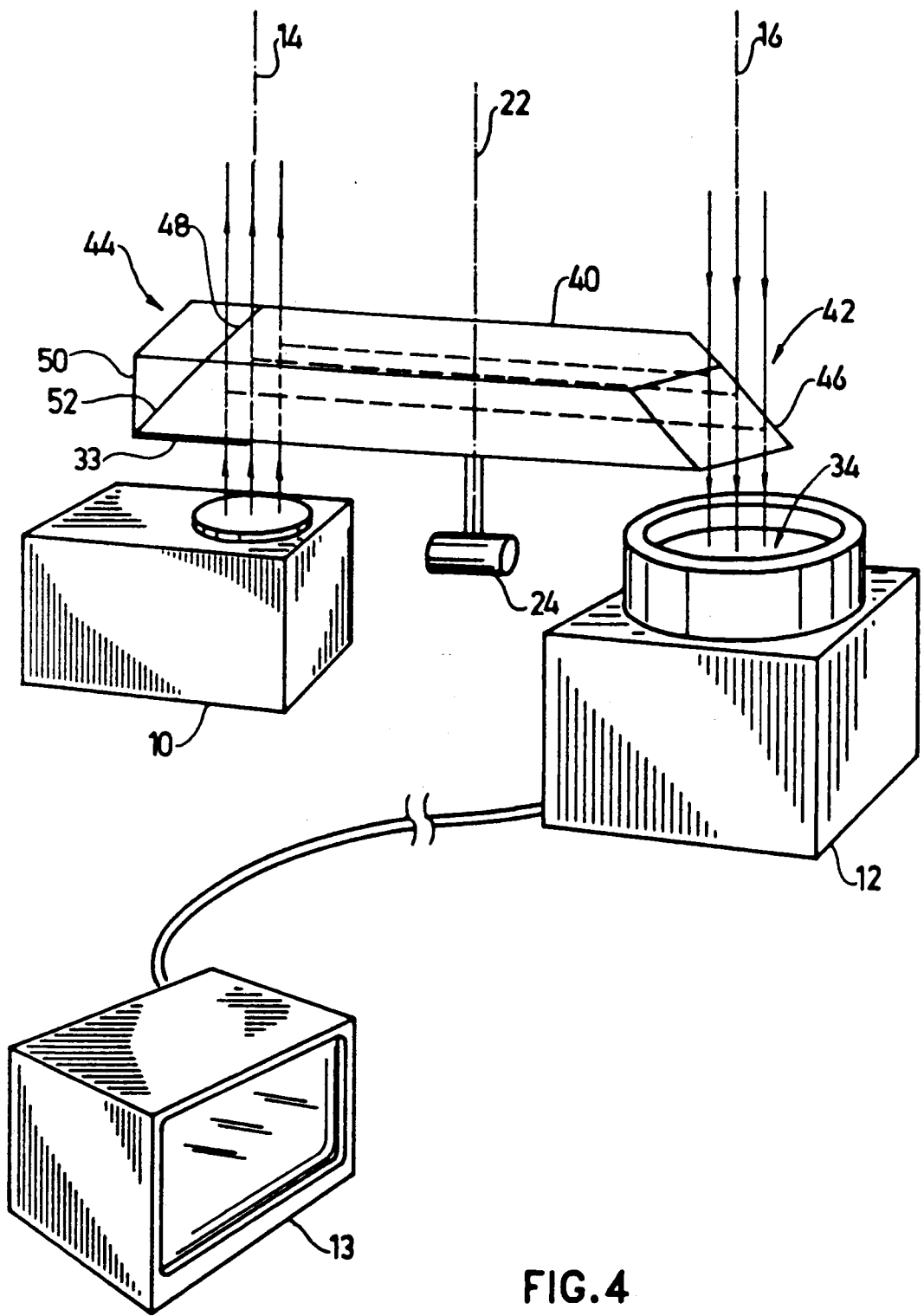
FIG. 4 is a schematic illustration of an electro-optical system similar to that shown in FIGS. 2 and 3, but employing a corner-cube constructed in accordance with an alternative embodiment of the invention, in a boresight mode of operation.

Shown in FIG. 4 is a system similar to that shown in FIGS. 2 and 3, but wherein corner-cube 40 is reversed so that first end 44 thereof intercepts line of sight 14 of radiation source 10. In this case, as part of the radiation emitted from source 10 is to be transmitted towards the target while part of the radiation is to be deflected towards sensor 12 for boresighting purposes, there is provided on interface 52 a beamsplitter coating.

According to the shown embodiment, it is preferred that the obscuration of the lens aperture be no greater than 30% at any time, so as to permit continued viewing while boresighting.

Figure 5:
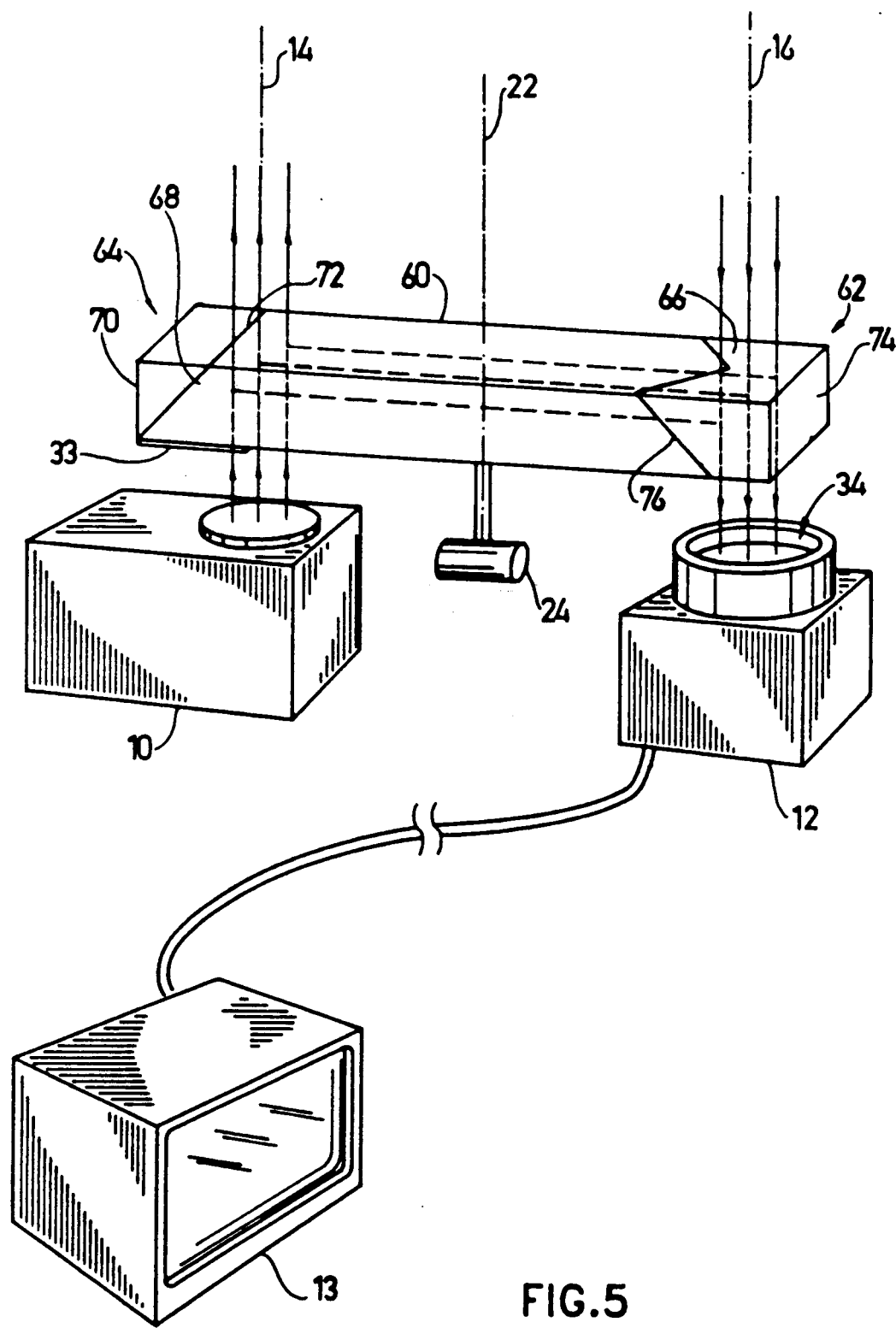
FIG. 5 is a schematic illustration of an electro-optical system similar to that shown in FIGS. 2 and 3, but employing a corner-cube constructed in accordance with an alternative embodiment of the invention in a first orientation.

Referring now to FIG. 5, there is shown an electro-optical system, similar to that shown in FIGS. 1-4, but employing a corner-cube assembly constructed and operative in accordance with a further embodiment of the invention. The assembly comprises a corner-cube 60 defining a roof surface 66 at a first end 62 and a plane surface 68 at a second end 64. In the shown embodiment, first end 62 of corner-cube 60 is operative to intercept the line of sight 16 of sensor 12, while second end 64 intercepts line of sight 14 of radiation source 10.

Mounted onto surface 68 at second end 64 of corner-cube 60 is a prism 70, such as a right angle prism, which serves, at end 64, to complete the generally rectangular configuration of the corner-cube assembly. The interface 72 between corner-cube 60 and prism 70 is coated with a beamsplitter coating, as mentioned above in connection with interface 52 (FIG. 3).

There is also provided, according to the shown embodiment, a glued-on complementary prism 74, which serves, at end 66, to complete the generally rectangular configuration of the corner-cube assembly. The interface 76 between corner-cube 60 and prism 74 is provided with a dichroic or beamsplitter coating, as mentioned above in connection with interface 52 (FIG. 4).

Figure 6:
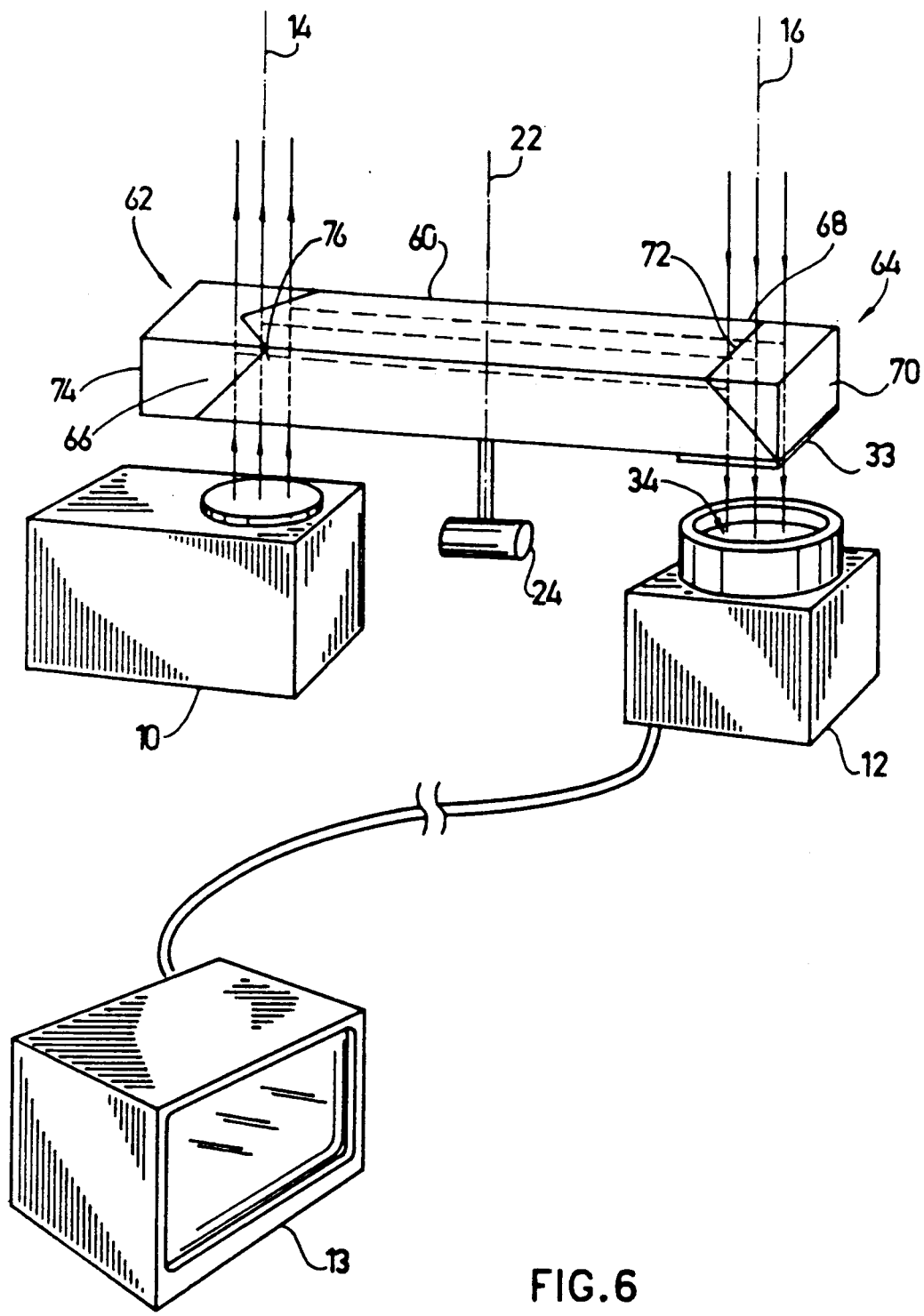
FIG. 6 is a schematic illustration of the electro-optical system shown in FIG. 5, but wherein the corner-cube is in a second orientation.

Referring now to FIG. 6, corner-cube 60 is shown to have an orientation opposite to that shown in FIG. 5, such that first end 62 of corner-cube 60 is operative to intercept the line of sight 14 of source 10, while second end 64 intercepts line of sight 16 of sensor 12.

Accordingly, the interface 72 between corner-cube 60 and right angle prism 70 is provided with a dichroic or beamsplitter coating, while the interface 76 between corner-cube 60 and prism 74 is provided with a beamsplitter coating.

Although the present invention, as exemplified in the embodiments shown and described in conjunction with FIGS. 2-6, employs a corner-cube positioned generally at right angles to lines of sight 14 and 16, in alternative embodiments of the invention, the corner-cube, with appropriate geometrical configurations at its first and second ends, may be positioned non-orthogonally with respect to the lines of sight.

It will be appreciated by persons skilled in the art that the present invention is not limited by what has been that the present invention is not limited by what has been particularly shown and described above by way of example. The scope of the invention is, rather, defined solely by the claims, which follow:

I claim:

1. Optical apparatus for transferring at least a portion of radiation emitted from a radiation source having a first line of sight to a radiation sensor having a second line of sight comprising:

a corner cube having first and second reflective ends arranged to intersect at predetermined orientations with said first and second lines of sight, respectively, and each having a predetermined orientation relative thereto;

prismatic means mounted onto at least one of said first and second reflective ends so as to define a common interface therewith; and an optical coating provided at said interface defined by said at least one of said first and second reflective ends and said prismatic means for permitting passage of a first portion of radiation while deflecting a second portion of radiation.

2. Optical apparatus according to claim 1, and wherein said first reflective end of said corner cube defines a roof surface and said prismatic means comprises at least a first end prism mounted onto said roof surface, said at least one optical coating being embedded between said roof surface and said first end prism.

3. Optical apparatus according to claim 1, and wherein said second reflective end of said corner cube defines a plane surface and said prismatic means comprises at least a second end prism mounted onto said plane surface, said optical coating being embedded between said plane surface and said second end prism.

4. Optical apparatus according to claim 1, and wherein said first reflective end of said corner cube defines a roof surface and said second reflective end of said corner cube defines a plane surface, said prismatic means comprising first and second end prisms respectively mounted onto said roof surface and said plane surface, a first optical coating being embedded between said roof surface and said first end prism and a second optical coating being embedded between said plane surface and said second end prism.

5. Optical apparatus according to claim 4, and wherein a predetermined one of a first optical assembly comprising said roof surface, said first end prism and said optical coating embedded therebetween and a second optical assembly comprising said plane surface, said second end prism and said optical coating embedded therebetween is arranged to deflect said second portion of radiation towards the radiation sensor.

6. Optical apparatus according to claim 4, and wherein a predetermined one of a first optical assembly comprising said roof surface, said first end prism and said optical coating embedded therebetween and a second optical assembly comprising said plane surface, said second end prism and said optical coating embedded therebetween is arranged to deflect said second portion of radiation towards the radiation sensor.

7. Optical apparatus according to claim 5, and wherein said second assembly is arranged to intersect with the second line of sight and said optical coating of said second assembly is a dichroic coating.

8. Optical apparatus according to claim 6, and wherein said second assembly is arranged to intersect with the second line of sight and said optical coating of said second assembly is a dichroic coating.

9. Optical apparatus according to claim 5, and wherein said second assembly is arranged to intersect with the second line of sight and said optical coating of said second assembly is a beamsplitter coating.

10. Optical apparatus according to claim 6, and wherein said second assembly is arranged to intersect with the second line of sight and said optical coating of said second assembly is a beamsplitter coating.

11. Optical apparatus according to claim 5, and wherein said second assembly is arranged to intersect with the first line of sight and said optical coating of said second assembly is a beamsplitter coating.

12. Optical apparatus according to claim 5, and wherein said first assembly is arranged to intersect with the first line of sight and said optical coating of said first assembly is a beamsplitter coating and said second assembly is arranged to intersect with the second line of sight and said optical coating of said second assembly is a dichroic coating.

13. Optical apparatus according to claim 5, and wherein said first assembly is arranged to intersect with the first line of sight and said second assembly is arranged to intersect with the second line of sight and said optical coatings of said first and second assemblies are beamsplitter coatings.

14. Optical apparatus according to claim 5, and wherein said first assembly is arranged to intersect with the second line of sight and said optical coating of said first assembly is a dichroic coating and said second assembly is arranged to intersect with the first line of sight and said optical coating of said second assembly is a beamsplitter coating.

15. Optical apparatus according to claim 5, and wherein said first assembly is arranged to intersect with the second line of sight and said second assembly is arranged to intersect with the first line of sight and said optical coatings of said first and second assemblies are beamsplitter coatings.

16. Optical apparatus according to claim 1, and wherein the radiation sensor includes a lens having an aperture of a determinable size and said one of first and second ends of said corner cube intersecting with the second line of sight is arranged so as not to completely obscure the aperture.

17. Optical apparatus according to claim 16, and wherein said aperture obscuration is not greater than 80%.

18. Optical apparatus according to claim 16, and wherein said aperture obscuration is not greater than 30%.

* * * * *